Figure 3:
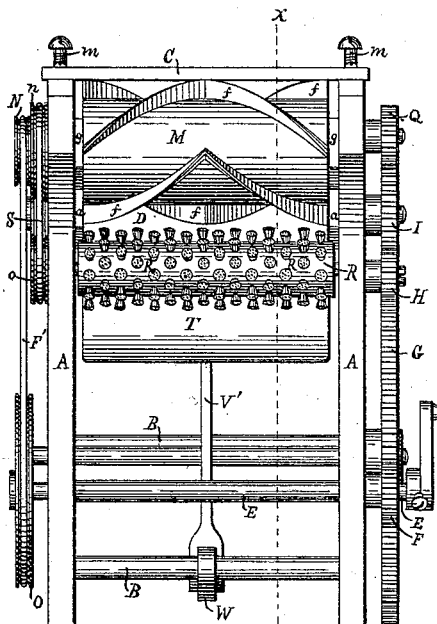

2 Sheets—Sheet 1.

B. F. LARRABEE.
MACHINERY FOR UNHAIRING, SCOURING, &c., HIDES AND SKINS.
No. 193,412. Patented July 24, 1877.

WITNESSES.
N. C. Lambard
E. A. Hemmenway

INVENTOR.
Benj. F. Larrabee

2 Sheets—Sheet 2.

B. F. LARRABEE.
MACHINERY FOR UNHAIRING, SCOURING, &c., HIDES AND SKINS.

No. 193,412. Patented July 24, 1877.

WITNESSES.
N. C. Lombard
E. A. Hemmenway.

INVENTOR.
Benj. F. Larrabee

UNITED STATES PATENT OFFICE.

BENJAMIN F. LARRABEE, OF LYNN, ASSIGNOR TO RICHARD HARRINGTON, OF SALEM, TRUSTEE OF THE ROBERTS HIDE WORKING MACHINE ASSOCIATION, OF BOSTON, MASSACHUSETTS.

IMPROVEMENT IN MACHINERY FOR UNHAIRING, SCOURING, &c., HIDES AND SKINS.

Specification forming part of Letters Patent No. 193,412, dated July 24, 1877; application filed December 30, 1876.

*To all whom it may concern:*

Be it known that I, BENJAMIN F. LARRABEE, of Lynn, in the county of Essex and State of Massachusetts, have invented certain new and useful Improvements in Machines for Unhairing, Scouring, and Currying Hides and Skins, of which the following, taken in connection with the accompanying drawings, is a specification.

My invention relates to a machine for removing the hair from hides and scouring or currying the same; and it consists, first, in the use, in combination, of a drum or cylinder, around which the hide or skin is partially wrapped while being acted upon; a feed-roll placed above said drum, and rolling in contact therewith, or with the hide or skin as it is passing through the machine; a feed-apron or endless belt arranged with its upper surface somewhat below the level of the top of the supporting-drum, and with its rear end in close proximity to said drum, so as to present the hide or skin to said drum at a point where its surface is moving upward and backward; and an operating or cleaning cylinder provided with one or more right and left spiral projections or knives, and arranged in the rear of the feed-roll, with its axis above the axis of the supporting-drum, in such a position that the spiral projections or knives thereon shall revolve in contact with the hide or skin when wrapped partially around the drum.

My invention further consists in the use, in combination with a drum for supporting the hide or skin, of a single feed-roll adapted to rotate in contact and in unison with said drum, and a cylinder located in the rear of said drum and feed-roll, and provided with one or more right and left spiral projections, adapted to rotate in contact with the hide or skin when passing between said cylinder and drum, of a cylindrical brush placed below the knife-cylinder, and adapted to revolve in contact with the supporting-drum, or the hide or skin passing over or around the same, but at a considerably greater speed than the drum, for the purpose of cleaning the skin after it has been acted upon by the knife-cylinder.

My invention further consists in the use, in combination with a supporting-drum around which the hide or skin is partially wrapped while being operated upon, and a cylinder provided with one or more right and left hand spiral projections or knives, the edges of which revolve in contact with and act upon the surface of the hide or skin when so wrapped around the drum, of a guard or shield, the upper edge of which is in close contact with said drum, and serves the double purpose of removing the hide or skin from the drum, thus preventing it from being carried entirely around the drum and wound thereon, and delivering it from the machine at the desired point.

My invention further consists in the combination, in a machine for removing the hair and lime from hides or skins, of a drum for supporting the hides or skins while being acted upon, mounted in movable boxes fitted to slide in slots in the side frames of the machine; a rocker-shaft extending across the machine parallel to the axis of said drum, and having secured thereto two radial arms adapted to engage at their movable ends with the under side of the boxes in which the drum revolves, and by a vibratory motion of said radial arms cause the drum to be moved toward or from the knife-cylinder; and a treadle and suitable connections for imparting a vibratory motion to said rocker-shaft and radial arms.

Figure 2:
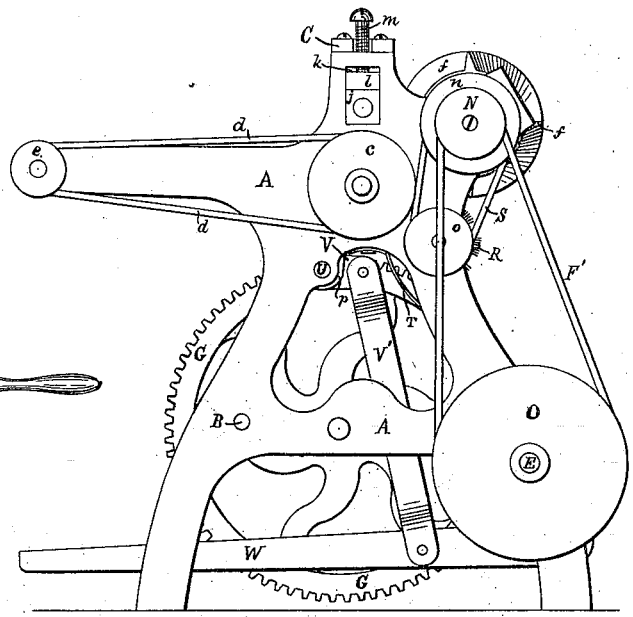
Figure 6:
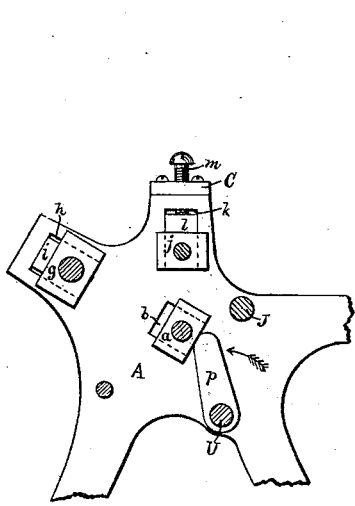
Figure 1:
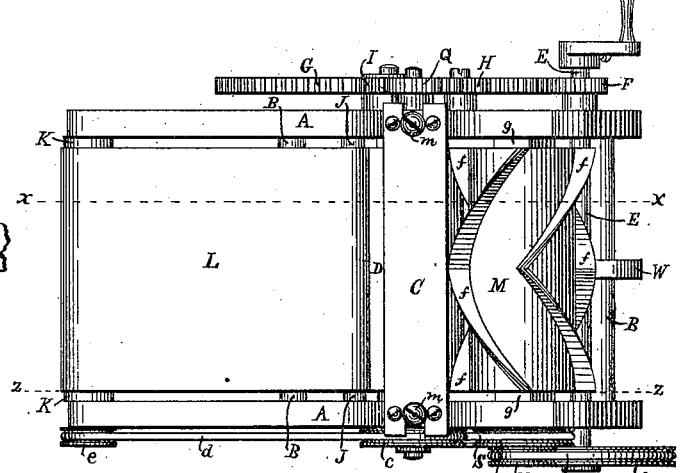
Figure 5:
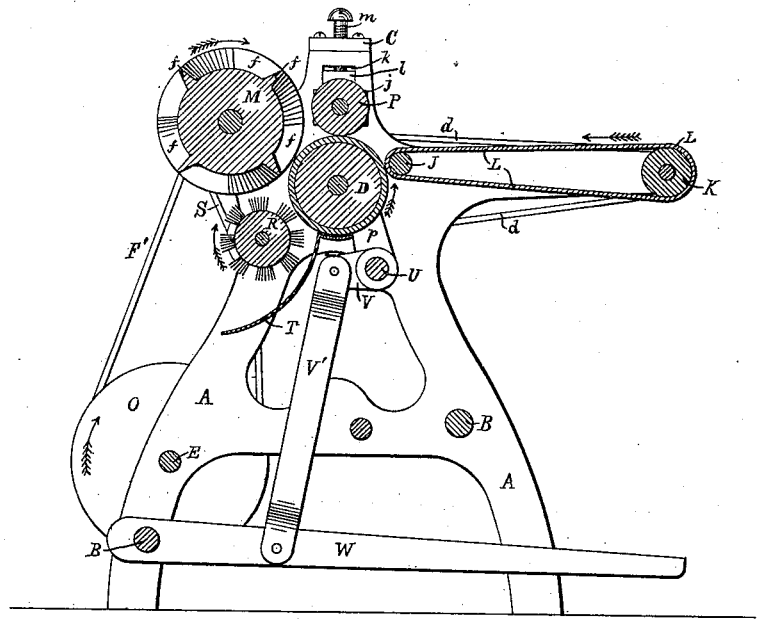
Figure 4:
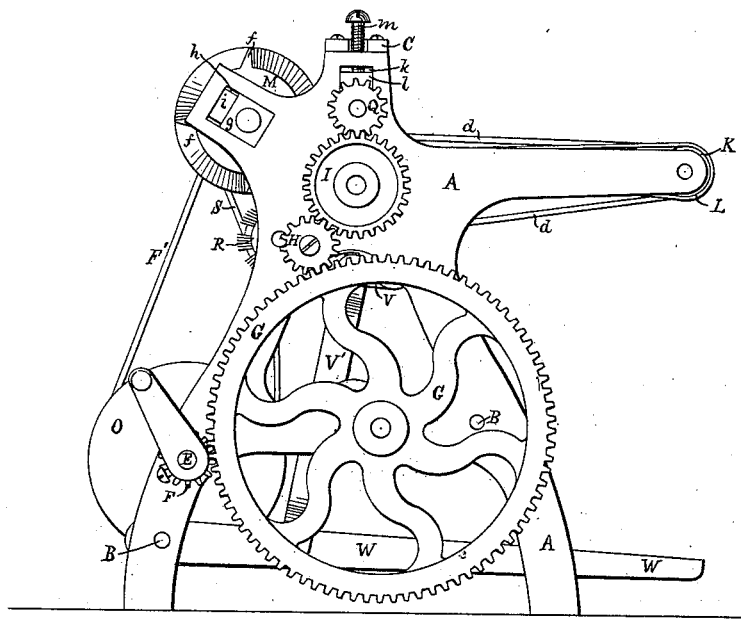

Figure 1 of the drawings is a plan of my improved machine. Fig. 2 is an end elevation. Fig. 3 is an elevation of the rear side. Fig. 4 is an elevation of the end opposite to that shown in Fig. 2. Fig. 5 is a vertical section on line $x\ x$ on Figs. 1 and 3. Fig. 6 is a section on line $z\ z$ on Fig. 1, illustrating the method of moving the supporting-drum toward the knife-cylinder.

A A are the side frames, connected together by the tie-rods B B and girt C. D is the work-supporting cylinder or drum, having its periphery covered with rubber, to render its outer surface elastic, so that it may accommodate itself to any inequalities in the thickness of the hide or skin, and mounted in the separate or detached boxes $a\, a$, fitted to and movable in the oblique slots $b\, b$, formed in the frames A A.

Motion is imparted to the drum D, in the direction of the arrow, by means of the driving-shaft E and gears F, G, H, and I.

J and K are two rolls, around which passes the endless apron or belt L, having motion imparted thereto, in the direction of the arrow, by the pulley $c$ on the end of the drum-shaft, and the belt $d$, leading therefrom to and around the pulley $e$ on the end of the shaft of the apron-roll K.

The upper surface of the apron L is placed some two or three inches below the level of the top of the drum D, so that the hide or skin will be presented to the drum by the movement of the apron at a point where the periphery is moving upward and backward, say, at an angle of about forty-five degrees, the roll J being so placed that the apron, passing around it, shall move in close proximity to the periphery of the drum D, but not in actual contact therewith.

M is the operating or cleaning cylinder, provided with the right and left hand spiral projections or blades $f\, f$, meeting in the center of the length of the cylinder, and extending therefrom partially around the cylinder toward the opposite ends thereof, substantially as shown and described in the Letters Patent No. 49,496, granted to Mellen Bray, August 22, 1865. This cylinder M is mounted in the boxes $g\, g$, fitted to the oblique slots $h\, h$, with the rubber or other springs $i\, i$ above said box, all so arranged that the cylinder M may yield to accommodate itself to thick or thin hides or skins, said cylinder being located in the rear of and partially above the drum D, with the outer edges of its spiral blades in position to act upon the hide or skin passing over and partially around the drum D.

Rotary motion in the direction of the arrow is imparted to the cylinder M by means of the pulley N on the end of the cylinder-shaft, the pulley $o$ on the end of the driving-shaft E, and the endless belt F, as shown in Fig. 2.

P is a feed-roll, placed directly over the drum D, and mounted in boxes $j\, j$, fitted to move vertically in slots $k\, k$, formed in the frames A A, and having the rubber or other spring $l\, l$ placed above the boxes $k$, and adapted to be adjusted by means of the set-screws $m\, m$, to increase or diminish the pressure of said roll upon the drum, or the hide or skin passing between it and the drum.

Rotary motion is imparted to the feed-roll by means of the gears I and Q.

R is a cylindrical brush, mounted in suitable bearings in the frames A A, in such a position that its periphery shall be in contact with the surface of the drum D, or the hide or skin passing over and partially around said drum, for the purpose of cleaning the hide or skin after it has been acted upon by the knife-cylinder M.

Rotary motion is imparted to the brush R, in the direction indicated by the arrows, by the belt S, leading from the pulley $n$ on the shaft of the cylinder M to the pulley $o$ on the end of the brush-shaft, as shown in Fig. 2.

T is a curved shield or guard extending across the machine below the drum D and the brush R, with its upper edge in close proximity to the under side of the drum, so as to serve the purpose of a "doctor-plate" to strip the hide or skin off from the drum, and prevent it from being wound around the same, and also to direct the hide or skin to the desired position for discharge.

U is a rocker-shaft, having its bearings in the frames A A, and having firmly secured thereon two radial arms, $p\, p$, one near either end of said shaft, the outer or movable ends of which bear against the under sides of the boxes $a\, a$, in such a manner that a movement of said arms in the direction indicated by the arrow will cause said boxes $a\, a$ and the drum D, having its bearings therein, to be moved obliquely in an upward direction.

It will be observed that the radius-arms $p\, p$ and the rocker-shaft U are so arranged relative to the boxes $a\, a$ that the radius-arms $p\, p$ act upon said boxes more in the nature of a wedge moving in an arc of a circle than as a direct lifter, and that by moving one of said radius-arms around the axis of the rocker-shaft slightly, while the other arm $p$ remains fixed, one end of the drum D may be raised or lowered, while the other remains stationary, for the purpose of adjusting the drum to the proper level.

V is another radial arm, also secured firmly upon the rocker-shaft U, and connected at its outer or movable end by means of the connecting-rod V' to the treadle W, so that the operator, by placing his foot upon the treadle W, can move the drum toward the knife-cylinder.

The operation of my machine is as follows: The machine being set in motion, the operator places a hide or skin upon the apron, with the hair side up, spreading it out as smooth as he can thereon, the apron in the meantime carrying the skin toward the drum D until its end comes in contact therewith, when the upward movement of the drum prevents the skin from being carried around the inner apron-roll, and compels the skin to follow the movement of the drum, and pass between it and the feed-roll P, where it is pressed hard upon the drum, and, being in a wet state, adheres firmly thereto, and is carried around thereby till it is slipped off by coming in contact with the shield T.

When the skin has advanced around the drum till its end is between the drum D and the knife-cylinder M, the operator places his foot upon the treadle, and, depressing it, causes the drum D to be moved toward the knife-cylinder till the edges of its knives come in contact with the surface of the skin with sufficient pressure to remove the hair, the knife.

cylinder revolving at a high rate of speed, while the hide or skin is fed forward quite slow. The skin, continuing to adhere to the drum, is carried between it and the brush R, also revolving at a high rate of speed, for the purpose of cleaning the skin. The skin then comes in contact with the shield T, and is stripped off from the drum, and, sliding down the shield, is discharged from its end at any desired point.

The advantages obtained in this machine, and which are due to the arrangement of the parts, are that the hide or skin may be spread upon a flat moving apron, which is more convenient than placing one end of the skin in contact with the drum, and holding it thereon till its end passes between the feed-rolls, as in Bray's patent, before cited, and also that the skin, when being acted upon by the knife-cylinder, is wrapped partially around the convex upper surface of the drum, whereby the skin is held more firmly, and the wrinkles are more completely removed, than when the skin moves in a straight line between the drum and knife-cylinder, resting upon a flat surface, as in the machine patented to T. Roberts, November 7, 1876, and numbered 184,175.

Another advantage, due to the arrangement of the parts, is that the drum D, besides serving as a support for the hide while being acted upon, also serves as a feed-roll, thereby dispensing with one feed-roll.

I do not claim, broadly, the knife-cylinder having right and left hand spiral blades for operating upon hides or skins, for removing the hair and lime, or scouring and currying the same; neither do I claim, broadly, the use of an endless moving apron for presenting the skin to the action of the knife-cylinder, as I am aware that the knife-cylinder and an endless moving apron, passing between the knife-cylinder and the supporting drum or roll, have been used before; but

What I claim as new, and desire to secure by Letters Patent of the United States, is—

1. The combination, in a machine for unhairing, scouring, and currying hides or skins, of the drum D, single feed-roll P, the cylinder M, provided with one or more right and left hand spiral blades or knives, and the endless apron L, when the several parts are arranged relative to each other as set forth—i. e., with the feed-roll above the drum, the knife-cylinder in the rear of said drum and feed-roll, and the apron with its upper surface below the level of the top of the drum, as and for the purposes described.

2. The combination and arrangement of the supporting-drum D, feed-roll P, knife-cylinder M, provided with one or more right and left hand spiral blades, $f\,f$, and the cylindrical brush R, all adapted to operate substantially as described, for the purposes specified.

3. The combination, in a machine for unhairing, scouring, or currying hides or skins, of the drum D, the cylinder M, provided with one or more right and left hand spiral blades, and the guard or shield T, all arranged and adapted to operate as and for the purposes described.

4. The combination, in a machine for unhairing, scouring, or currying hides or skins, of the cylinder M, provided with one or more right and left hand spiral blades, $f\,f$, the drum D, mounted in the detached boxes $a\,a$, fitted to and movable independently of each other in slots in the side frames of the machine, the rocker-shaft U, the treadle-lever W, connected to the rocker-shaft by the rod V' and lever V, and the radius-arms $p\,p$, mounted upon the rocker-shaft, and bearing at their movable ends against the under side of said boxes $a\,a$, and adapted to raise the drum D by a vibratory motion of said arms about the axis of the rocker-shaft, substantially as described.

Executed at Boston, Massachusetts, this 28th day of December, A. D. 1876.

BENJ. F. LARRABEE.

Witnesses:
N. C. LOMBARD,
E. A. HEMMENWAY.